United States Patent
De Gier et al.

(10) Patent No.: US 10,520,141 B2
(45) Date of Patent: Dec. 31, 2019

(54) INTEGRATED AIR GUIDE AND BEAM SHAPING

(71) Applicant: SIGNIFY HOLDING B.V., Eindhoven (NL)

(72) Inventors: Ronald Cornelis De Gier, Eindhoven (NL); Thomas Deflandre, Eindhoven (NL); Peter John Franck, Eindhoven (NL); Mark Johannes Antonius Verhoeven, Eindhoven (NL); James Jehong Kim, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/086,529

(22) PCT Filed: Apr. 12, 2017

(86) PCT No.: PCT/EP2017/058842
§ 371 (c)(1),
(2) Date: Sep. 19, 2018

(87) PCT Pub. No.: WO2017/182370
PCT Pub. Date: Oct. 26, 2017

(65) Prior Publication Data
US 2019/0049074 A1 Feb. 14, 2019

Related U.S. Application Data

(60) Provisional application No. 62/326,041, filed on Apr. 22, 2016.

(30) Foreign Application Priority Data

Jun. 14, 2016 (EP) ..................... 16174292

(51) Int. Cl.
F21K 9/62 (2016.01)
F21V 7/00 (2006.01)
(Continued)

(52) U.S. Cl.
CPC .............. *F21K 9/62* (2016.08); *F21V 7/0083* (2013.01); *F21V 7/041* (2013.01); *G02B 6/0096* (2013.01);
(Continued)

(58) Field of Classification Search
CPC ..... G02B 6/0096; F21V 7/0083; F21V 7/041; F21K 9/62
(Continued)

(56) References Cited

U.S. PATENT DOCUMENTS

| 8,104,907 B2 | 1/2012 | Shchekin et al. |
| 9,268,082 B2 | 2/2016 | Van Dijk et al. |

(Continued)

FOREIGN PATENT DOCUMENTS

| CN | 204086648 U | 1/2015 |
| CN | 20447835 U | 7/2015 |

(Continued)

*Primary Examiner* — Gerald J Sufleta, II
(74) *Attorney, Agent, or Firm* — Daniel J. Piotrowski

(57) ABSTRACT

The invention provides a lighting unit (1000) comprising a light mixing chamber (100) defined by faces (110) and an edge face (130), wherein a height (H) of the light mixing chamber (100) defined by a distance between the faces (110) is smaller than a first length (L1) of the light mixing chamber (100), wherein the lighting unit comprises a plurality of light sources (10) configured to provide light source light (11) in the light mixing chamber (100), wherein at least one of the faces (110) comprises a plurality of chamber openings (141) for escape of at least part of the light source light (11) from the light mixing chamber (100), wherein the lighting unit (1000) further comprises a plurality of beam shaping ele- (Continued)

ments (150), with each beam shaping element (150) configured downstream from a corresponding chamber opening (141, and wherein the beam shaping elements (150) comprise reflectors (200).

14 Claims, 5 Drawing Sheets

(51) Int. Cl.
  *F21V 7/04* (2006.01)
  *F21V 8/00* (2006.01)
  *F21Y 115/10* (2016.01)
  *F21Y 105/18* (2016.01)
(52) U.S. Cl.
  CPC ....... *F21Y 2105/18* (2016.08); *F21Y 2115/10* (2016.08)
(58) Field of Classification Search
  USPC .......................................................... 257/89
  See application file for complete search history.

(56) References Cited

U.S. PATENT DOCUMENTS

| | | | |
|---|---|---|---|
| 9,291,767 B2 | 3/2016 | Boonekamp | |
| 2006/0203468 A1* | 9/2006 | Beeson | G02B 27/286 362/84 |
| 2008/0211989 A1* | 9/2008 | Park | G02F 1/133603 349/64 |
| 2009/0003002 A1* | 1/2009 | Sato | G02B 6/0043 362/341 |
| 2010/0321919 A1 | 12/2010 | Yang | |
| 2011/0018012 A1* | 1/2011 | Tanaka | F21V 3/00 257/89 |
| 2011/0044026 A1* | 2/2011 | Deeben | H01L 33/508 362/84 |
| 2012/0039084 A1* | 2/2012 | Eckhardt | G02B 5/124 362/516 |
| 2012/0113679 A1* | 5/2012 | Boonekamp | G02B 6/0068 362/607 |
| 2012/0120672 A1* | 5/2012 | Stagg | B60Q 1/2607 362/510 |
| 2013/0077345 A1* | 3/2013 | Sato | G02B 6/0061 362/609 |
| 2013/0223079 A1* | 8/2013 | Jung | F21S 8/02 362/297 |
| 2014/0016310 A1* | 1/2014 | Xie | F21V 5/007 362/231 |
| 2014/0078730 A1* | 3/2014 | Li | F21V 7/06 362/231 |
| 2015/0176810 A1* | 6/2015 | Mitchell | F21V 13/04 362/293 |
| 2015/0267885 A1* | 9/2015 | Freier | F21S 11/007 362/235 |
| 2017/0191637 A1* | 7/2017 | Gommans | F21V 5/002 |

FOREIGN PATENT DOCUMENTS

| | | |
|---|---|---|
| DE | 102012205188 A1 | 10/2013 |
| JP | 2008027886 A | 2/2008 |
| JP | 2009231128 A | 10/2009 |
| JP | 2010277727 A | 12/2010 |
| JP | 2011146225 A | 7/2011 |
| JP | 2014143139 A | 8/2014 |
| JP | 2014154332 A | 8/2014 |
| JP | 2015521780 A | 7/2015 |
| WO | 2011155537 A1 | 12/2011 |
| WO | WO2012136572 A1 | 10/2012 |
| WO | WO2014164792 A1 | 10/2014 |

\* cited by examiner

INTEGRATED AIR GUIDE AND BEAM SHAPING

CROSS-REFERENCE TO PRIOR APPLICATIONS

This application is the U.S. National Phase application under 35 U.S.C. § 371 of International Application No. PCT/EP2017/058842, filed on Apr. 12, 2017, which claims the benefits of European Patent Application No. 16174292.9, filed on Jun. 14, 2016 and U.S. Application No. 62/326,041, filed on Apr. 22, 2016. These applications are hereby incorporated by reference herein.

FIELD OF THE INVENTION

The invention relates to a lighting unit comprising a light mixing chamber.

BACKGROUND OF THE INVENTION

Thin luminaires are known in the art. WO2014/164792, for instance, describes a luminaire which includes a mixing chamber having an array of apertures in one wall, a light source to supply light into the mixing chamber, and an array of optics outside the mixing chamber, each positioned to cooperate with a respective one of the apertures to emit light from the mixing chamber as a beam. The shape, size, and/or direction of the output light beam are controllably varied by controlling the shape, size, and/or position of each aperture relative to its associated optic.

SUMMARY OF THE INVENTION

Slim downlights are becoming more and more dominant on the market, because of their ease of mounting and integration in the overall building design. Key in such design may be the minimized height in relation to the diameter. The products may be provided with a large light emitting surface. Especially, such product may have a Lambertian light distribution and therefore may have a relative high luminance intensity at higher viewing angles. For such thin downlights it is quite a challenge to generate emission of a desired quality level of light.

Beam shaping of the light can be done by using e.g. TIR (Total Internal Reflection) elements that change the direction of the light. The size of the optic is directly related to the size of the source. So if the total light emitting surface of a slim downlight is seen as one source, the optic element becomes very high in respect to the source, such that the required height of the lighting unit becomes too large (or the diameter or width becomes smaller than desired). A solution may be found in having multiple small light sources that have an individual optic in front, and together function as a whole. Since the source is made much smaller, the optic element can also be made much smaller. The problem then becomes how to create the small sources and how to align the sources to all the optics, also e.g. including thermal expansion effects. One can e.g. use a lot of individual LEDs but that may create a high risk in LED failure, difficult electrical systems to balance the current, and high cost for all the LEDs, etc.

Hence, it is an aspect of the invention to provide an alternative lighting unit, which preferably further at least partly obviates one or more of above-described drawbacks or meets one of the abovementioned challenges, and which may especially be relatively thin and/or which may be produced in a relatively easy way.

In an embodiment, the invention proposes creating a lighting unit with a mixing box (or light mixing chamber) (comprising openings) in which a ring of LEDs (configured to provide light source light) is made. The rim of the mixing box (light mixing chamber) is made by a LED board and top and bottom side(s) may be closed by a high reflective diffuse layer. One (of the top and bottom) side(s) is equipped with a plurality of small (chamber) openings, arranged in e.g. a non-fully regular pattern. Via these (chamber) openings, the (light source) light can escape from the mixing box (light mixing chamber). These openings may be understood as secondary (light) sources. The beam shaping optics and the secondary (light) sources may be made in the same component to provide good alignment of the secondary (light) sources and the beam shaping optics. Hence, in an aspect the invention provides a lighting unit ("unit") comprising a light mixing chamber ("mixing chamber" or "chamber" or "mixing box") defined by faces and an edge face, wherein especially a height (H) of the light mixing chamber defined by a distance between the faces is smaller than a first length (L1) of the light mixing chamber, wherein the lighting unit comprises a plurality of at least ten light sources configured to provide light source light in the light mixing chamber, wherein at least one of the faces comprises a plurality of chamber openings ("openings") for escape of light (especially at least part of the light source light) from the light mixing chamber, wherein the chamber openings have a length equivalent to the thickness of the face comprising said chamber openings, and have a shape and/or diameter that varies with the length, wherein the lighting unit further comprises a plurality of beam shaping elements, with each beam shaping element configured downstream from a corresponding chamber opening, and wherein the beam shaping elements especially comprise reflectors, wherein the plurality of at least ten light sources are configured in an evenly distributed manner at the edge face and are configured to provide said light source light having an optical axis perpendicular to the height, and wherein the beam shaping elements are configured in a pseudo random pattern.

Such lighting unit may allow a low height of the lighting unit in respect to e.g. a length, a width or a diameter of the lighting unit. Further, such a lighting unit especially may be a slim or shallow lighting unit. The lighting unit may be produced in a relatively easy way and alignment (of the openings and the respective beam shaping elements) may be easier or even not necessary. Further, such lighting unit may allow an effective passive and/or active cooling, which is beneficial for the lifetime of the unit. Such lighting unit may allow lighting of a closed or open space, such as a room, an office, a store, a shop window, etc. In embodiments (see also below), such lighting unit may be integrated in a ceiling or a wall. In other embodiments such lighting unit may be arranged in a (motorized) vehicle, especially allowing lighting a street or the inside of the vehicle, etc.

The lighting unit comprises a "light mixing chamber", also herein referred to as "(light) mixing box". In the light mixing chamber, especially light source light provided by the plurality of light sources is mixed. At least part of the light source light provided by a light source may be reflected (see also below) in the light mixing chamber, e.g. at a location of the faces and/or the face edge and may mix with light source light from another light source (or from the same light source light). Hence, the light mixing chamber may mix light source light of light sources which have substantially identical spectral distributions or which differ in spectral distributions.

The light that escapes from the lighting unit, which light is also indicated as "lighting unit light" or "beam shaped light, may essentially consist of the light source light. However, in embodiment also the lighting unit light may comprise converted light source light. For instance, the lighting unit may comprise a luminescent material that can be excited by the light source light. The luminescent material light (or converter light) may be comprised by the lighting unit light, optionally in combination with (some) remaining light source light. Therefore, the plurality of light sources are configured to generate lighting unit light, with the lighting unit light being generated directly (i.e. essentially light source light) and/or indirectly (due to conversion of at least part of the light source light into luminescent material light). For instance, a luminescent material may be comprises by walls, may be coated to faces, or may be embedded in a waveguide. For the sake of ease, herein in general it is only referred to light source light. It is however to be noted that in addition to light source light, or even at least partly alternative to light source light, also luminescent material light (i.e. light converted light) may escape from the lighting unit, especially from the light mixing chamber. Hence, in general the plurality of light sources is configured for generation of lighting unit light (directly (lighting unit light essentially consists of light source light and/or indirectly (lighting unit light at least comprises luminescent material light).

The lighting unit may be designed in all kind of ways. In embodiments, a beam of light may be provided with cut-off angles of 65° or smaller, wherein at angles larger than the cut-off angle, the luminance is equal to or smaller than 1000 Cd/m$^2$, such as equal to or smaller than 800 Cd/m$^2$. Also cut-off angles smaller, or optionally larger than 65° may be chosen, dependent upon the application. With the lighting unit, it is possible to define the cut-off angle and/or the beam shape.

The light mixing chamber especially contains air. Herein, the term "air guide" may also be used in relation to the "light mixing chamber" for embodiments comprising air. Hence, in embodiments the volume defined by the light mixing chamber is essentially filled with air. Especially, the light source light provided by the light sources may be guided by the air guide from the light sources to the chamber openings, directly and after (internal) reflection. Air guides are known in the art.

The light mixing chamber is defined by faces and an edge face. The faces and the edge face may comprise different kind of shapes. For instance, the faces may comprise a rectangular shape, a circular shape, an elongated shape, a curved shape, an undulating shape, a square shape, etc. The faces may also comprise multiple shapes and/or the different faces may comprise different shapes. Likewise, the edge face may comprise different kinds of shapes, such as mentioned before in relation to the faces. Especially, the edge face is arranged between (part of) an edge of a first face and (part of) an edge of a second face, especially to define the (light mixing) chamber. In embodiments, the light mixing chamber may comprise a "free" shape. The light mixing chamber comprises at least two faces and an edge face. In embodiments, the edge face may comprise multiple edge faces, such as two edge faces, three edge faces (such as for a chamber with a triangular cross section), four edge faces (such as for a chamber with a square or rectangular cross section). In embodiments, the light mixing box comprises exact two faces and an edge face (such as for a chamber with a circular or oval cross section). In other embodiments the light mixing box comprises more than two edge faces.

The at least ten light sources are configured at the edge face, with specially the light sources configured at the edge face configured to provide the light source in a direction into the light mixing chamber facing away from the edge face. Hence, the plurality of light sources are configured at the edge face and are configured to provide said light source light having an optical axis transverse or perpendicular to the height. This feature contributes to the desired quality of light as it is counteracted in this way that (LED) light sources can be directly seen by users/observers, thus reducing the risk on glare. The number of at least ten light sources that are evenly distributed about the edge face contributes to a more homogeneous light output of the lighting unit and thus further enhances the quality of light. In embodiments, the faces are arranged substantial parallel (which includes parallel curved faces). The faces may especially be the faces of wall elements or panels that enclose the light mixing chamber. Hence, the chamber openings in the face comprising such chamber openings may have a length equivalent to a thickness of such wall element comprising such face. Hence, such wall element comprises through holes with at one side providing the chamber openings at the internal face The shape and/or equivalent diameter, especially at least the equivalent diameter, varies with the length. Especially, when the equivalent diameter varies with the length of the through hole, the equivalent diameter may increase with increasing distance from the chamber opening in the face. By varying the shape and/or equivalent diameter of the chamber openings the beam characteristics of the emitted light source light can be tuned and hence contribute to the quality of light.

The beam shaping elements are configured in a pseudo random pattern. Especially, the beam shaping elements may be configured in a phyllotaxis pattern, more especially a phyllotaxis spiral pattern. The chamber openings, and thus also the beam shaping elements may be configured in different types of patterns. Also combinations of patterns may be used. For instance, the configuration may be cubic or hexagonal. Especially, it appears that such highly symmetric patters are perceived less desirable. Regular patterns involve the risk of being imaged on the illuminated area which is experienced as less desirable. The pseudo random (or fully random) patterns, the risk of imaging is reduced and hence the experienced quality of light is increased.

In further embodiments, two faces comprise a circular shape and the edge face comprises a cylindrical shape. Especially, the faces are configured parallel to each other and the edge face is located between the edges of the faces. In such embodiments, the light mixing chamber may comprise a disk-like shape. Especially in such disk-like shaped light mixing chamber, the distance between the faces may substantially be the same over the light mixing chamber and a height of the light mixing chamber may be equal to the distance between the faces. Likewise, the first length of this disk-like shaped light mixing chamber may be equal to the maximum distance of a line connecting a first location at the edge of a face to a second location at the edge of said face, especially equal to the diameter of the faces.

In other embodiments, two faces (especially arranged parallel to each other) comprise an elliptical shape having a major axis (or transverse diameter) and a minor axis (or conjugate diameter), and the first length of the light mixing chamber may be equal to the length of the major axis (especially when faces are configured such that a line connecting the center of the first face and the center of the second face is perpendicular to the major and minor axis).

In yet other embodiments, a first face is curved and a second face is a flat face. Especially, in such embodiments the (shortest) distance (height) between a first location at the first face and a second location at the second face may depend on the position of the location(s).

Especially, the light mixing chamber has a (flat) disk-like or (flat) plate-like shape.

Hence, the first length of the light mixing chamber may especially be defined by a characteristic distance, such as a width, a length or a diameter. Hence, the term "first length" may refer to one or more of a length, a width, a diameter, a transverse diameter, a conjugate diameter, etc. In embodiments wherein a length, a width, a transverse diameter, or a conjugate diameter is chosen as first length, a second length may be chosen from a width, a length, a conjugate diameter or a transverse length, respectively. In yet other embodiments, as first length a diagonal is selected (especially when faces are configured such that a line connecting the center of the first face and the center of the second face is perpendicular to the major and minor axis).

In embodiments comprising a less symmetric or asymmetric shape, the characteristic distance may be selected differently. For instance, the characteristic distance of a C-shaped embodiment may be the distance between two extremities of the C-shape, measured along an internal surface of one of the (edge) faces.

Hence, in embodiments the light chamber may have a disc-like shape or a beam-like shape, or a plate-like shape, etc. Especially, one or more of the faces, even more especially both faces, are substantially flat. Especially, the edge may be curved and/or consist of two or more square or rectangular elements.

Especially, a height of the light mixing chamber is smaller than a first length of the light mixing chamber. In embodiments, the ratio of the first length of the light mixing chamber and the height of the light mixing chamber is selected from the range of 200:1-2:1, especially 200:1-1:1, such as 150:1-5:1, especially 100:1-10:1. Especially, the aspect ratio may be larger than 1. In further embodiments, the first length is selected from the range of 20 mm-2000 mm, such as 50 mm-1000 mm, especially 50 mm-500 mm. In yet further embodiments, the height of the light mixing chamber is selected from the range of 2 mm-100 mm, such as 2 mm-50 mm, especially 5 mm-40 mm, even more especially 5 mm-25 mm, such as 5 mm-20 mm, especially 5 mm-10 mm. In further specific embodiments, the height of the light mixing box is selected from the range of 15-20 mm. Especially, the lighting unit has a ratio of the first length (L1) to the height (H) of $1 \leq L1/H \leq 100$, especially $2 \leq L1/H \leq 100$, even more especially $5 \leq L1/H \leq 100$ (with the latter two series of embodiments having aspect ratios larger than 1).

As indicated above, the height of the light mixing chamber may vary over the first length and/or the (first) length may vary over height of the light mixing chamber. The above indicated ratios may especially refer to maximum height and lengths. Further, the above indicated dimensions refer to distances between faces, and thus especially refer to the dimensions of the cavity or chamber defined by the faces and edge face. However, in embodiments the external dimensions of the lighting unit may also be selected from above values and/or ratios, especially from such ratios. Hence in embodiments the lighting unit has a ratio of an external length (Lex) to an external height (Hex) of $1 \leq Lex/Hex \leq 100$, especially $2 \leq Lex/Hex \leq 100$, even more especially $5 \leq Lex/Hex \leq 100$.

The plurality of light sources provide the (primary) light source light.

In specific embodiments, the light sources comprise solid state LED light sources (such as LEDs or laser diodes). The plurality of light sources especially may comprise a plurality of LED light sources. In embodiments, the plurality of (LED) light sources comprise one type of (LED) light source. In other embodiments, the plurality of (LED) light sources comprise at least two types of (LED) light sources configured to provide light source light with different spectral distributions, such as LEDs from different bins. For instance, blue LEDs and yellow LEDs, or blue LEDs and green LEDs and red LEDs may be provided. Such combination may be arranged to be able to provide white light. Especially, the colors of the different LEDs may be mixed in the light mixing chamber. Hence, the plurality of lights sources may include two or more subsets of light sources with each light source configured to provide substantially the same light (same spectral distribution), or with each subset configured to provide substantially the same light (same spectral distribution), or with two or more subsets configured to provide light with different spectral distributions. In embodiments, one or more light sources are configured to provide white light. In yet other embodiments, one or more subsets are configured to provide white light, and one or more other subsets are configured to provide colored light. In yet further embodiments, two or more subsets are configured to provide white light with different spectral distributions, such as having different correlated color temperatures. In such ways, in embodiments also the spectral distribution of lighting unit light, i.e. the light provided by the lighting unit, may be tunable. Hence, in yet further embodiments the lighting unit may comprise a control system configured to control one or more of the intensity of the light sources and the color of the light sources. In yet further embodiments, the control system may be configured to (thereby) control one or more of the intensity of the lighting unit light, the spectral distribution of the lighting unit light, and a beam shape of the lighting unit light.

In embodiments, at least part of the total number of light sources is configured outside of the light mixing chamber, and configured to provide the light source light in the light mixing chamber. The light source light may for instance be coupled in the light mixing chamber through a face (including an edge face), especially a (light) transmissive face. Hence, a wall element (comprising such face) may be applied that is transmissive for the light source light.

Additionally or alternatively, at least part of the total number of light sources are configured inside the light mixing chamber and the light source light is directly provided in the light mixing chamber. Especially, the plurality of light sources are configured within the light mixing chamber. Additionally or alternatively, at least part of the total number of light sources is at least partly comprised by a wall element comprising such face (including an edge face), and configured to provide the light source light in the light mixing chamber.

In further embodiments, the plurality of light sources comprise light emitting faces, such as LED dies. Hence, in embodiments, the plurality of light sources comprise light emitting faces, wherein the light emitting faces are configured within the light mixing chamber.

In embodiments at least part of the total number of light sources are configured at (at least one of) the faces (including the edge face). In embodiments, the light sources are configured at a face comprising the chamber openings, with the light sources especially configured to provide light source light with optical axis transverse or perpendicular to such face and in a direction away from such face. Note that both faces may comprise chamber openings.

In yet other embodiments, the light sources are configured at a face not comprising the chamber openings, with the light sources especially configured to provide light source light with an optical axis transverse or perpendicular to such face and in a direction away from such face, thus especially to the face comprising chamber openings.

Combinations of two or more of such embodiments may also be applied (see also below).

Especially, the lighting unit comprises at least ten, more especially at least 16 light sources, such as especially at least 30, even more especially at least 56. The number of light sources may be related to the (surface) area of a face. Especially high numbers, such as at least 10, especially at least 30, of light sources may be advantageous for a uniform distribution of light source light escaping from the light mixing chamber. Especially, a lower number of light sources may be cost efficient. The total number of light source lights may be a compromise between cost, availability, lifetime, uniformity and light output. Especially, the number of light sources may be proportional to the (surface) area of a face. In embodiments, the number of light sources per $m^2$ area of (one of the) face(s) is selected in the range of $10\text{-}500/m^2$, especially $50\text{-}500/m^2$, such as $100\text{-}400/m^2$, even more especially in the range of $150\text{-}300/m^2$.

The provided light source light travels away from the light sources and may be redirected such as reflected in the light mixing chamber, especially by a face (including the edge face). The redirected (reflected) light (again) may travel towards a face and be redirected (reflected) again in the light mixing chamber. Due to multiple reflections (redirections) (inside the light mixing chamber), light may travel through the light mixing chamber until it escapes from there via a chamber opening.

In embodiments, a face may comprise a smooth surface to redirect light. Especially, the faces, including the edge face, comprises a light reflective material, such as a light reflective coating. Alternatively or additionally, an element such as a wall element or edge providing a face or edge face may substantially consist of reflective material. An example of a reflective material is e.g. microcellular formed polyethylene terephthalate (MCPET) or microcellular foamed sheet made from polycarbonate resin (MCPOLYCA). Also coatings of e.g. $Al_2O_3$, $MgO$, $BaSO_4$, etc., may be applied. In embodiments a face may comprise a (highly) diffuse reflective (white) layer.

In further embodiments, a face may comprise a rough surface to redirect the light. Especially, a face may comprise one or more structures, especially a plurality of structures, to provide a reflection in different directions. Especially, the light source light may be redirected (reflected) in different directions. Hence, in embodiments, the light mixing chamber comprises other elements or structures configured to redirect the light source light. The elements or structures may especially be configured at the faces and/or the edge face. Examples of such elements are reflective elements, and may be configured as e.g. dots or stripes, and may be configured in patterns. The elements for instance may have been provided by 3D printing at the faces (including the edge face) and/or during manufacturing of the light mixing box. Especially, at least one of the faces comprises elements configured to redirect light source light within the light mixing chamber. These elements may have the function of secondary light sources. Such elements, or at least a part of the total number of elements, may be aligned with the chamber openings, but this is not necessarily the case. Such elements may have heights and/or widths for instance in the range of up to about 5% of the height, such as 0.01-2% of the height of the light mixing chamber. The length of such elements may be in the range of the first length, but may also be in the range of up to about 5% of the height, such as 0.01-2% of the height of the light mixing chamber. Further, such elements may be configured in regular patters, irregular patters, or a pseudo random pattern. When such elements have the function of secondary light sources, the chamber openings may have the function of ternary (and secondary) light sources.

The light mixing chamber, especially at least one face thereof, comprises a plurality of chamber openings, allowing at least part of the light source light to escape from the light mixing chamber. Especially, (light source) light may be coupled out of the light mixing chamber via a chamber opening. In embodiments, only one face comprises the chamber openings for escape of at least part of the light source light.

Especially, the size and the number of chamber openings may affect the amount of light source light that may escape the light mixing chamber, and especially the intensity of the light. The chamber openings may comprise any kind of (cross-sectional) shape, such as a circular shape, a triangular shape, an elliptical shape, a hexagonal shape, or any free shape. Especially, the chamber openings comprise a circular shape. Especially, the chamber openings may (each) have an area selected from the range of $0.02\ mm^2\text{-}300\ mm^2$, such as in the range of $1\ mm^2\text{-}10\ mm^2$. Hence, especially the chamber openings have equivalent diameters selected from the range of 0.2-20 mm, such as 0.5-10 mm. With too large openings, uniformity of the light may become an issue; and too small openings may become less practical. Herein, the equivalent diameter for a given opening (having a non-circular shape) is defined as being equal to the diameter of a circle having the same area as the given opening. Here, the term "area" especially relates to a cross-sectional area (with the cross-section in the plane of the respective face).

The plurality of chamber openings may comprise only one type of geometry. Alternatively, the plurality of chamber openings may comprise different geometries, such as chamber openings having different sizes (areas). It may especially be advantageous to select the size of the openings larger at a location further downstream from the light sources compared to the size of an opening located near one or more of the light sources. Hence, in embodiments, the equivalent diameters of the chamber openings vary as function of the distance from the edge face. Especially in such embodiments, the equivalent diameter of the openings may increase with increasing distance from the edge face. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Especially, the face(s) comprising the plurality of chamber openings comprises in the range of 0.01-100 chamber openings/$cm^2$, especially in the range of 0.01-50 chamber openings/$cm^2$, even more especially in the range of 0.01-10 chamber openings/$cm^2$, such as in the range of 0.1-2 chamber openings/$cm^2$. Especially, a face comprises at least 10 chamber openings, such as at least 20 chamber openings.

In embodiments the chamber openings and first openings (see also below) of the beam shaping elements will not coincide.

The lighting unit further comprises beam shaping elements. Especially, a beam shaping element is configured downstream from a corresponding chamber opening. Such a configuration allows beam shaping of the light source light that escapes from the light mixing chamber, especially to provide beam shaped light (which can also be indicated as "lighting unit light"). Hence, especially the number of beam shaping chamber openings is at least as large as the number of beam shaping elements. In embodiments, the number of beam shaping elements equals the number of chamber openings. The beam shaping elements allow to shape the beam of the light escaping from the light mixing chamber, such as shaping the beam width and/or beam shape. Additionally or alternatively, the beam shaping elements may control the direction of the light source light escaping from the light mixing chamber. In embodiments, the plurality of beam shaping elements may comprise different geometries. In yet other embodiments, the beam shaping elements may comprise identical geometries. The beam shaping elements may have shapes selected from tubular, conical, pyramid like, etc. In embodiments, the beam shaping elements may be configured as collimators.

Each beam shaping element may comprise a first opening and a second opening, with a (reflective) face bridging the distance between the first and second opening. The first opening is configured closer to the light mixing chamber than the second opening. The first opening is especially configured to receive light escaped from the light mixing chamber and the second opening is especially configured to provide (at least) part of the lighting unit light. Hence, the latter is configured downstream from the former. In embodiments, the total area of the cross-sectional areas of second openings is in the range of at least about 70%, such as especially at least about 80%, even more especially at least about 90% of the area of the face comprising the chamber openings. Walls between adjacent beam shaping elements may include in the range of 0.1-30%, such as 0.1-20%, such as 0.2-10%, of a total surface area defined by a (virtual) plane defined by the second openings (this (virtual) plane may have an area substantially identical to the area of the face comprising said chamber openings).

The beam shaping elements according to the invention may comprise reflectors. In embodiments, the reflectors comprise a metallic (mirror) material, such as a metallic layer. In further embodiments, a surface of a reflector may be metalized, especially to create a specular reflective surface. In further embodiments, the reflector may comprise a reflecting paint. The geometry of the beam shaping elements, especially of the reflector, may be selected to provide the beam shaped light (especially, the direction and/or the shape of the beam shaped light). Hence, in embodiments the reflectors comprise a first reflector opening, especially configured aligned with the chamber openings (i.e. each reflector configured aligned with a corresponding chamber opening) for receipt of light source light escaping from the light mixing chamber and further comprising a second reflector opening for escape of beam shaped light, especially wherein a reflector face is configured between a first reflector opening and a corresponding second reflector opening. Herein, a reflector face may also comprise more than one reflector face. In embodiments, at least part of reflector faces configured between said first reflector openings and said second reflector openings comprise a reflective material, especially a metallic mirror material. The beam shaping element may taper in a direction from the second opening to the first opening (the former having a larger cross-section than the latter).

In embodiments, the first reflector opening comprises substantially the same shape and size as the corresponding chamber opening. In embodiments, the second reflector opening comprises substantially the same shape as the corresponding first opening. Alternatively, the shape of the second reflector opening may differ from the shape of the first reflector opening. Especially, the size of the second reflector opening may be larger than the size of the corresponding first reflector opening. Especially, the reflector may comprise a tapered shape comprising a smaller size of the first reflector opening than the size of the corresponding second reflector opening. Reflectors are a specific embodiment of the above described beam shaping elements. Embodiments concerning shapes, area percentages, etc. apply thus also to the reflectors.

In specific embodiments, the chamber openings and first openings of the beam shaping elements may coincide. In other embodiments, there is a non-zero distance between the chamber openings and first openings of the beam shaping elements. Especially, in such embodiments, the chamber openings in the face comprising such chamber openings may have a length equivalent to a thickness of such wall element comprising such face see also above. Further, in such embodiments the through holes may especially have a tubular shape. In such embodiments, also the beam shaping elements may be provided as separate entities or as subsets of beam shaping elements that are configured as separate entities downstream of the chamber openings. Especially, however, the beam shaping elements are configured in a fixed position relative to the chamber openings.

However, in yet other embodiments the beam shaping elements and a wall element comprising the chamber openings may be a single unit. For instance wall elements may include the chamber openings and the beam shaping elements. In embodiments, the wall element may include a plurality of conical indentations with at the first opening or bottom of the conical indentation a tubular connection with the chamber opening. In yet other embodiments, as indicated above, the chamber openings and first openings of the beam shaping elements may coincide. Hence, in embodiments the face comprising said plurality of chamber openings and the plurality of beam shaping elements are comprised by a single unit. This may further facilitate production of the lighting unit.

Alternatively or additionally, the face comprising said plurality of chamber openings and at least part of the edge face are comprised by a single unit. An integration of two or more of the elements of the lighting unit may also useful in view of thermal management.

The open structure of the lighting unit may also add to thermal management. Through the chamber openings the chamber may be in fluid contact with its environment. Hence, natural convection may help in temperature control of the lighting unit. In yet further embodiments, the light mixing chamber further comprises one or more air openings, especially configured at one or more of the edge face and a face not comprising the plurality of chamber openings. For instance, air may enter via such opening and heated air may escape via the chamber openings having optical functions. However, this may also be the other way around, with air entering via the chamber openings and heated air escaping via the air openings. Flow of air may also vary over the first length and/or height of the chamber. In yet further embodiments, the lighting unit further comprises an air flow generating device, such as a small pump, an (air) ventilator, an air jet, a venturi, etc., configured to provide an air flow within the light mixing chamber. In further embodiments, one or more of the edge face and the face comprising the plurality of chamber openings comprises a thermally conductive material. For instance, at least part of the lighting device may comprise aluminum, or another thermally conductive material, such as steel, cupper, magnesium, a heat conducting plastic, etc.

At least part of the lighting unit, such as a wall element comprising the beam shaping elements, or a separate element comprising beam shaping elements, etc. may be provided by one or more of 3D printing and injection molding.

The lighting unit may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting.

The term white light herein, is known to the person skilled in the art. It especially relates to light having a correlated color temperature CCT between about 2000 and 20000 K, especially 2700-20000 K, for general lighting especially in the range of about 2700 K and 6500 K, and for backlighting purposes especially in the range of about 7000 K and 20000 K, and especially within about 15 SDCM standard deviation of color matching from the BBL black body locus, especially within about 10 SDCM from the BBL, even more especially within about 5 SDCM from the BBL.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
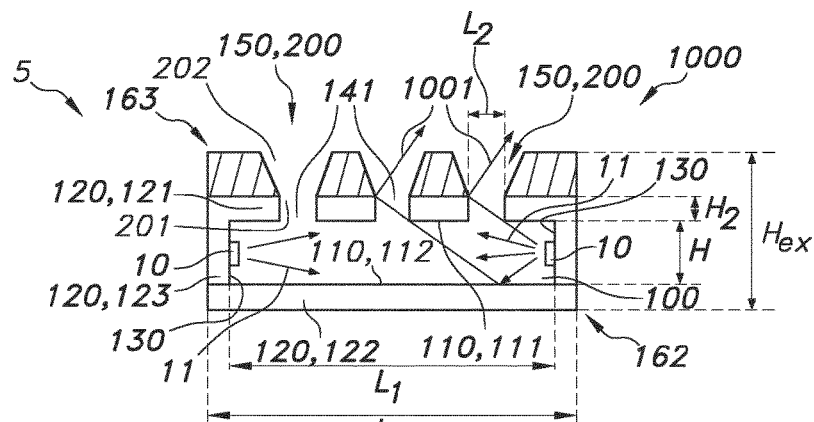
FIGS. 1a-1c schematically depict some embodiments and aspects of a lighting unit.

FIG. 1a schematically depicts an embodiment of a lighting unit 1000 comprising a light mixing chamber 100 defined by faces 110 and an edge face 130, wherein a height H of the light mixing chamber 100 is defined by a distance between the faces 110. The faces 100 can be distinguished between a first face 111 and a second face 112. The distance between these faces defines the height H. The first length L1 is defined by the distance between the edge faces 130. The edge faces 130 may be a single edge face, such as in the case of e.g. a circular device. However, the edge faces 130 may also include a plurality of different faces, such as in the case of a mixing chamber having a square, rectangular, hexagonal, etc., cross-section. Here, the cross-section refers to a cross-section perpendicular to the plane of drawing, i.e. a cross-section parallel to a mixing chamber plane. The drawing shows a cross-section in the plane of the drawing, i.e. a cross-section parallel to the height H of the mixing chamber 100. In this schematically depicted embodiment, the height H is smaller than a first length L1 of the light mixing chamber 100. In embodiments, the first length may refer to a length or a diameter, see also above.

The lighting unit comprises a plurality of light sources 10 configured to provide light source light 11 in the light mixing chamber 100. Especially, the light sources comprise LEDs. Here, by way of example only two light sources 10 are depicted, but in general much more light sources may be available, such as at least 10, like at least 20.

At least one of the faces 110 comprises a plurality of chamber openings 141 for escape of at least part of the light source light 11 (and/or luminescent material light when luminescent material that is excitable by the light source light is available in the light mixing chamber 100) from the light mixing chamber 100. Here, by way of example only the first face 111 comprises such chamber openings 141. However, in other embodiments, for instance for pendant lighting units, both faces 111 and 112 may include such openings. Note that the number of openings, the arrangement of the openings, and the geometry of the openings may differ for both faces 111,112 when both faces would comprise such chamber openings 141.

The chamber 100 is also defined by walls or wall elements 120. A first wall element 121 may provide the first face 111, a second wall element 122 may provide the second face 112, and a third wall element 123 may provide the edge face 130. The chamber openings 141 in the face 110, here first face 111, are through openings, i.e. through the wall element 120, here first wall element 121. Hence, in embodiments, such as the embodiment schematically depicted in FIG. 1a the chamber openings are through holes having a height H2. Such height may e.g. be in the range of 0.1-10 mm, especially 0.5-5 mm. Further, the chamber openings 141 may have a length L2. This length may also be defined as equivalent diameter, as the chamber openings may have any cross-sectional shape, not only square or circular. The equivalent diameter may be in the range of 0.2-20 mm. Note that in the in FIG. 1a schematically depicted embodiment the chamber openings 141 in the face 110, here first face 111 comprising such chamber openings 141, may have a length here indicated as height H2 equivalent to a thickness of such wall element 120 here 121 comprising such face 110.

Especially, the lighting unit described herein is characterized by the light mixing box, especially by the first length L1 and height H. The lighting unit may further be defined by an external length Lex and an external height Hex. Especially, the external length Lex comprises the third wall element 123. Especially, the external height Hex comprises the first wall element 121 and the second wall element 122. Substantially the same ratios may apply to Lex and Hex as to L1 and H.

Further, the lighting unit 1000 further comprises a plurality of beam shaping elements 150, with each beam shaping element 150 configured downstream from a corresponding chamber opening 141. Hence, light escaping via the chamber openings 141 may travel further through (the wall element and) the beam shaping element 150. Especially, the beam shaping elements 150 comprise reflectors 200. Hence, in embodiments such as schematically depicted in FIG. 1a, there is a fluid communication between the chamber 100 and the external of the lighting unit 1000, with the external of the lighting unit 1000 being indicated with reference 5.

As schematically depicted in FIG. 1a, the beam shaping elements 150 may be configured as separate entity or entities over or on the wall element 120 with the chamber openings 141. In embodiments, the plurality of beam shaping elements are comprised by a single body. Here, this body is indicated with the dashed areas.

Light source light 11 (and/or other light generated due to the light source light) escaping from the lighting unit 1000 (i.e. from the chamber and from the beam shaping elements) is indicated as lighting unit light 1001.

Here, each beam shaping element 150 comprises a first beam shaping element opening configured aligned with a respective chamber opening 141 for receipt of light source light 11 escaping from the light mixing chamber 100 and comprises a second beam shaping element opening for escape of beam shaped light 1001. Especially thus, the reflectors 200 comprise a first reflector opening 201 configured aligned with the chamber openings 141 for receipt of light source light 11 escaping from the light mixing chamber 100 and comprising second reflector openings 202 for escape of beam shaped light 1001. Hence, in this way beam shaped lighting unit light 1001 may be provided. As will be clear to a person skilled in the art, the term "configured aligned" may e.g. indicate that an axis of a beam shaping element may substantially coincide with axis through a chamber opening. Such axes may include a central point of the beam shaping element and chamber opening respectively.

As schematically depicted, the third wall element 123 (providing the edge face 130) may be a part of a larger element also comprising the first wall element 121 (providing the first face). Hence, in embodiments the face 110 comprising said plurality of chamber openings 141 and at least part of the edge face 130 are comprised by a single unit 162.

The walls may be made of a light reflective material, such as aluminum or a material including a light reflective coating.

Figure 1B:
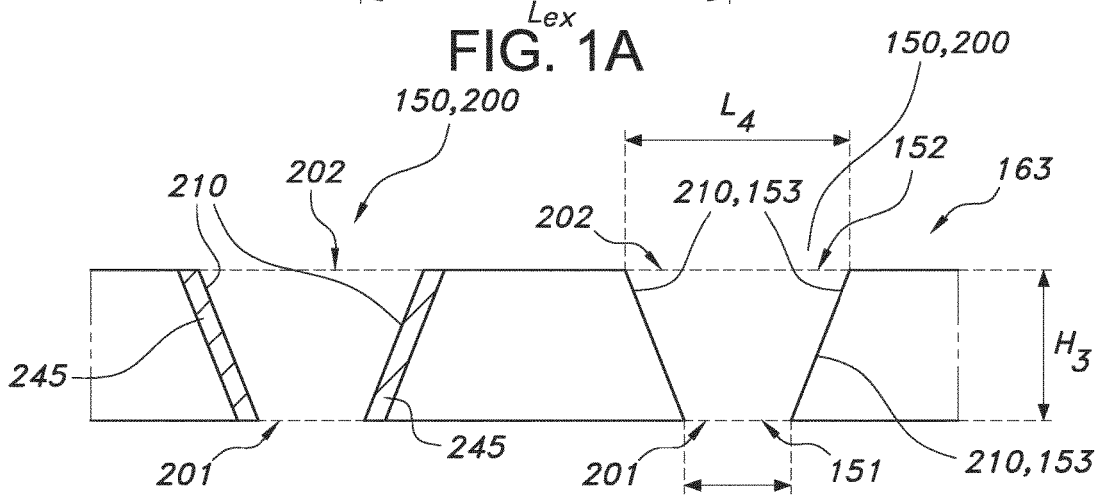

Referring to FIG. 1b, which schematically depicts in some more detail embodiments of the beam shaping elements 150. The beam shaping elements 150 may comprise a first opening 151 and a second opening 152, with a (reflective) face 153 bridging the distance between the first opening 151 and second opening 152. The first opening 151 is configured closer to the light mixing chamber 100 than the second opening 152. The first opening 151 is especially configured to receive light source light 11 escaped from the light mixing chamber 100, and the second opening 152 is especially configured to provide (at least) part of the lighting unit light 1001. The plurality of beam shaping elements 150 may be comprised in a single integral structure, indicated with reference 163. The first opening 151 is (thus) configured upstream of the second opening 152.

Figure 1C:
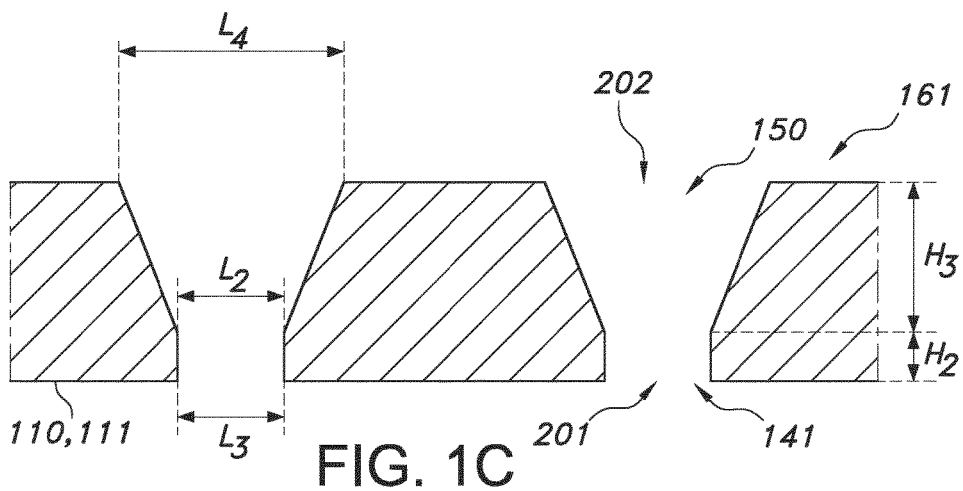

As indicated above, the beam shaping elements 150 especially comprise reflectors 200. Thus, the reflectors 200 comprise a first reflector opening 201 configured aligned with the chamber openings 141 for receipt of light source light 11 escaping from the light mixing chamber 100 and comprising second reflector openings 202 for escape of beam shaped light 1001. As shown in FIG. 1b, at least part of (reflector) faces 210 between said first reflector openings 201 and said second reflector openings 202 comprise a metallic mirror material 245. In FIG. 1b the references L3 and L4 indicate the equivalent diameter of the first (reflector) opening 151,201 and the second (reflector) opening 152,202, respectively. L3 is in embodiments substantially identical to L2. Further, in specific embodiments L3=L4. In general L4>L3 (as schematically depicted in FIG. 1a-1c). Reference H3 indicates the height (or thickness) of the beam shaping elements, which may e.g. be in the range of 0.1-100 mm, such as 0.5-50 mm. In FIG. 1b, the beam shaping elements 150 are reflectors 200.

FIG. 1c schematically depicts an embodiment wherein the face 110 comprising said plurality of chamber openings 141 and the plurality of beam shaping elements 150 are comprised by a single unit 161. For instance, the part between the chamber opening 141 and the first reflector opening 201 may be cylindrical and the part between the first reflector opening 201 and the second reflector opening may be conical. Of course, this single unit 161 and the single unit 162 may also be provided as an integrated single unit. In embodiments, reflectors may be deposited on the faces 153 bridging the distance between the first opening 151 and second opening 152 (here face 210 is bridging the distance between the first reflector opening 201 and second reflector opening 202 and is configured as reflective face).

Figure 2A:
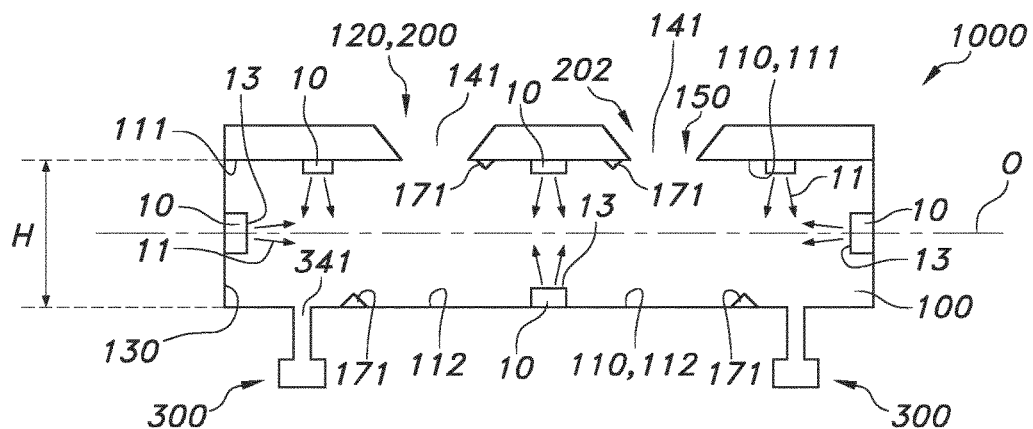
FIGS. 2a-2g schematically depict some further embodiments and aspects of the lighting unit.

FIG. 2a schematically depicts a plurality of variants in a single schematic drawing.

Amongst others, this schematic drawing shows an embodiment wherein at least part of the total number of the plurality of light sources 10 are configured at the edge face 130 and are configured to provide said light source light 11 having an optical axis O perpendicular to the height H. However, other light sources 10 are configured differently, such as at the first face 111. Yet other light sources 10 are configured at the second face 112. Note that the light sources may be configured at one or more of these (edge) faces 130,111,112. In this schematic drawing, by way of example an embodiment is depicted wherein light source 10 are configured at all (depicted) faces.

Further, this drawing schematically shows an embodiment wherein at least one of the faces 110 comprises elements 171 configured to redirect light source light 11 within the light mixing chamber 100. These elements are schematically depicted as triangular structures, such as tetrahedral or triangular ridges.

Yet further, this drawing schematically shows an embodiment wherein the lighting mixing chamber 100 further comprises one or more air openings 341. For instance, these may be configured at one or more of the edge face 130 and a face 110 not comprising the plurality of chamber openings 141. However, optionally also a face 110 comprising the plurality of chamber openings 141 may include air openings 341, which are not configured as openings for escape of light source light 11. The air openings 341 may be configured such, that escape of light via such air openings is minimized. Especially, the accumulated cross-sectional area of such air openings is (substantially) smaller than the accumulated cross-sectional area of the chamber openings 141 (for escape of light source light 11). Air may be sucked via one or more of such air openings 341, but also via one or more of the beam shaping elements 150. In this way, air may flow in the chamber 100 and also escape there from, which assists in thermal management.

Even yet further, this drawing schematically shows an embodiment further comprising an air flow generating device 300 configured to provide an air flow within the light mixing chamber 100. Especially, the air flow generation device is in (direct) fluid contact with the one or more air openings 341.

Figure 2B:
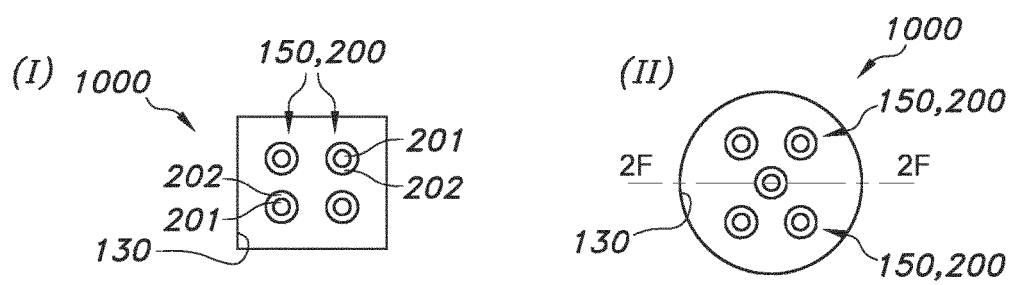
Figure 2B:
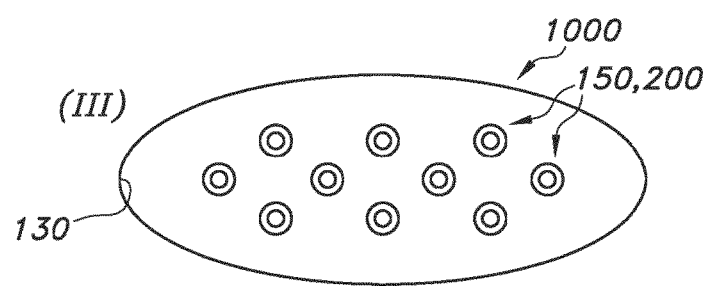

FIG. 2b schematically depict a number of embodiments of the lighting unit 1000, shown in top view, with I showing an embodiment having a square cross-section, II showing an embodiment having a circular cross-section, and III showing an embodiment having an oval cross-section, with the cross-section in a plane parallel to the plane of drawing, e.g. parallel to a first face 111 or a second face 112 (see for those faces FIG. 1a or 2a).

Figure 2C:
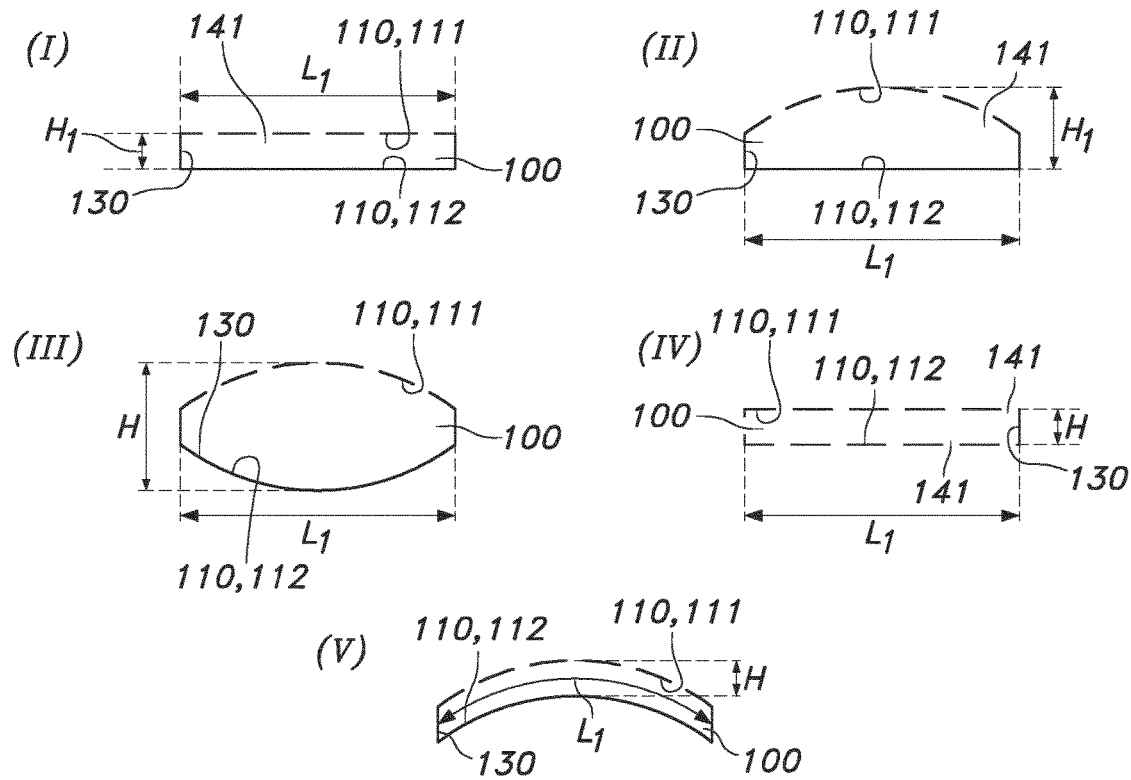

FIG. 2c schematically a number of embodiments of the chamber 100 are shown, which may in embodiments also imply a similar geometry of the lighting unit 1000. The embodiments are shown in a cross-sectional view, with the cross-section in a plane e.g. also comprising the axis indicating the height, with a cross-section in a plane parallel to the plane of drawing, i.e. a plane substantially perpendicular to a first face 111 or a second face 112. A plate like chamber 100 is shown (I), a plate-like chamber with a curved first face 111 is shown (II), a disc-like chamber 100 is shown (III), with both faces 111,112 being curved, and an embodiment is shown wherein both the first face 111 and the second face 112 comprises chamber openings (IV). Note that the latter embodiment is not limited to a plate like embodiment, but may also apply to other embodiments described and/or schematically depicted herein. Yet further, a C-shaped or banana-like shaped chamber 100 is schematically depicted (V).

Figure 2D:
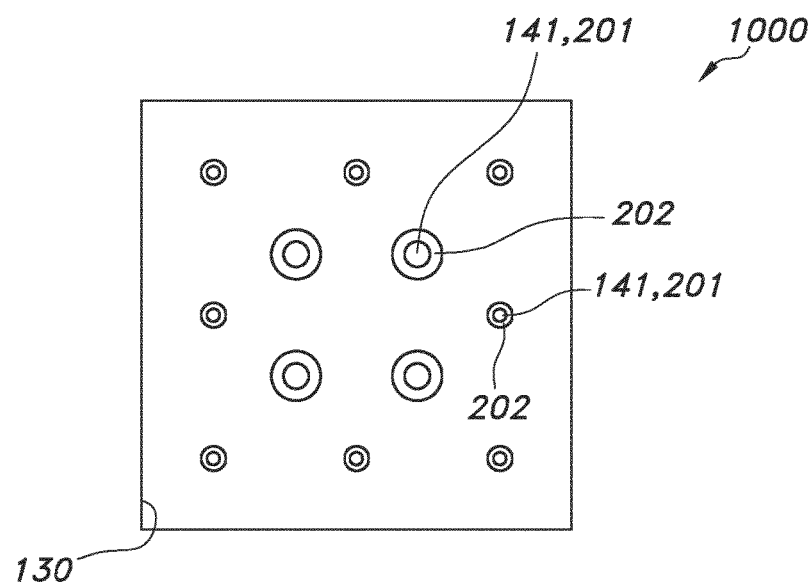

FIG. 2d schematically depicts an embodiment of the lighting unit 1000 in top view wherein the equivalent diameters of the chamber openings 141 vary as function of the distance from the edge face 130, with smaller openings closer to the edge faces 130 and larger openings further away from the edge faces 130.

Figure 2E:
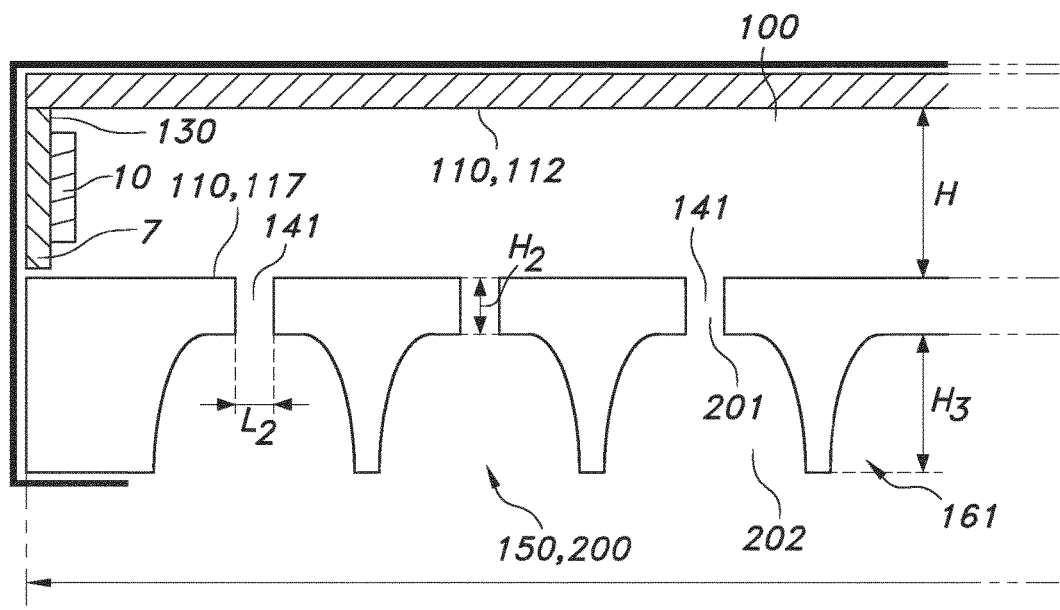
Figure 3:
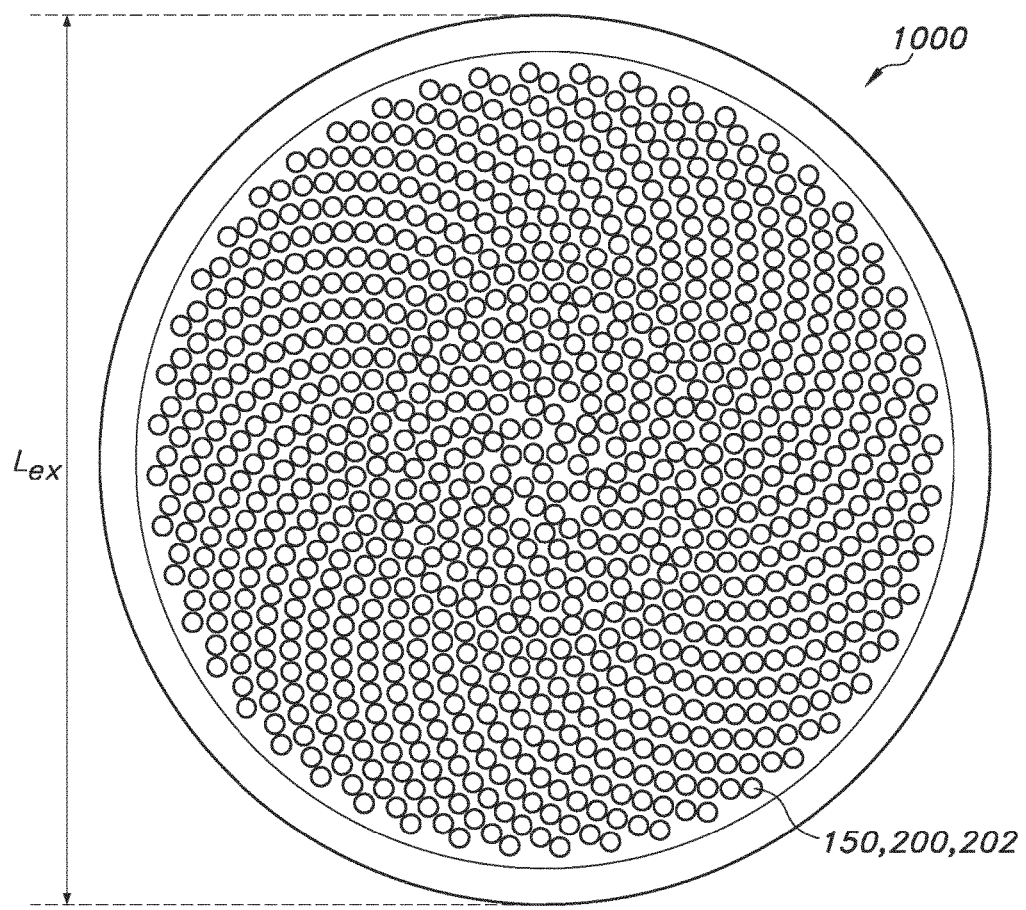
FIG. 3 shows an example of the lighting unit.

Hence, in embodiments a cavity or chamber 100 is created in which a ring of LED's is made, see FIG. 2e (cross-sectional view). The rim of the cavity is made by the LED board and top and bottom side are closed by a high reflective diffuse layer. One side is equipped with a lot of small holes 141 arranged in a pattern. Via these holes 141, the light can exit the cavity. These holes can be seen as secondary (lighting) sources (also indicated as tertiary light sources). In the same component the beam shaping optics 150 are made and by that ensure the best alignment of the secondary (lighting) sources 141 and the beam shaping optics 150. The secondary (lighting) sources 141 are made by small holes with a diameter of e.g. 2 mm in an (injection molded) plate but also other manufacturing technologies can be used like 3D printing. The surfaces of the beam shaping elements 150 are metalized to create a specular reflective surface. The surface is made out of white plastic that is highly diffuse reflective. The holes 141 and reflectors 200 can be arranged in a so called Phyllotaxis pattern as can be seen in FIG. 3, but also other patterns are possible. This plate is mounted on top of a cavity in which the LED strip is placed at the outer rim with the LEDs shining inwards. The bottom side of the cavity is covered with a high reflective white diffuse layer like MCPET. Reference 7 indicates a PCB (printed circuit board), which in this embodiment has a height substantially equal to the height H of the chamber 100.

Figure 2F:
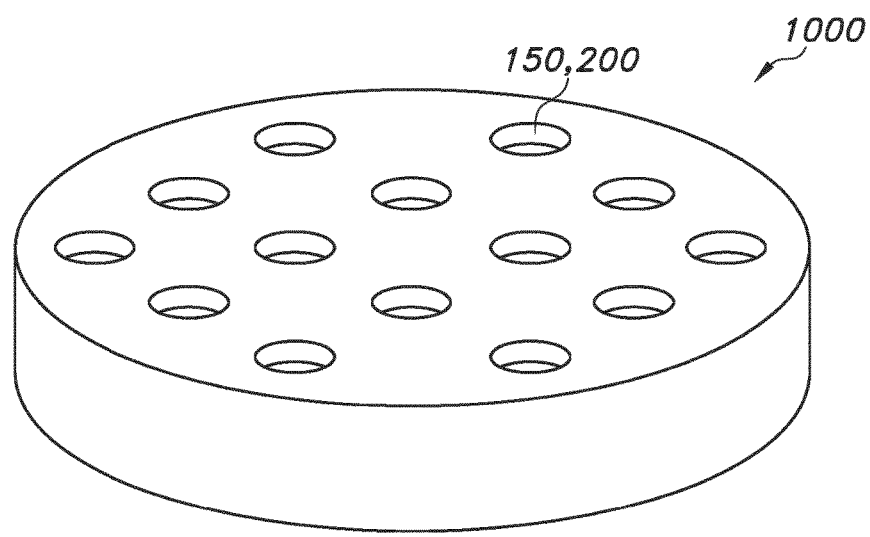

FIG. 2f schematically depicts a 3D sketch of an embodiment such as schematically depicted in FIG. 2b (II).

Figure 2G:
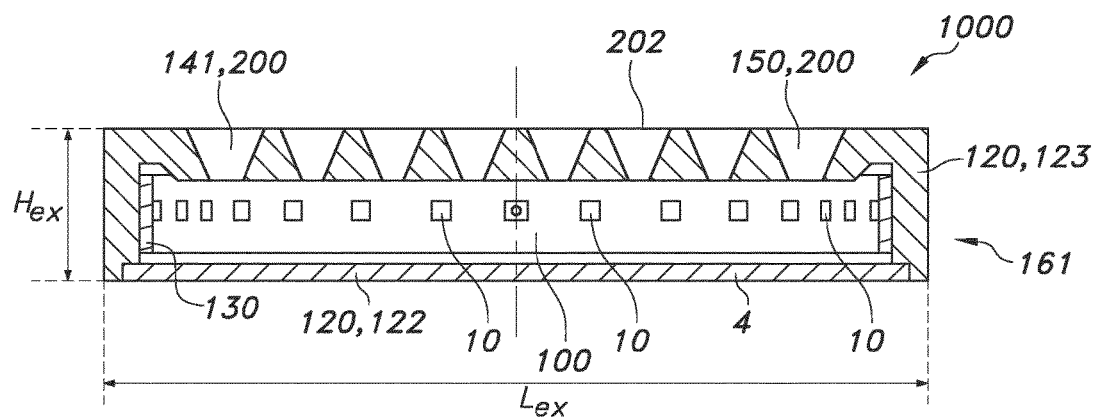

A solution herein also proposed is to create a beam shaping element which is made out of a good thermal conductive material such as aluminum or magnesium which is placed on the large light emitting surface of the luminaire. This surface is typically facing downwards to the room when installed at the ceiling. This beam shaping element is made such that it is in good thermal contact with the LED's, so that the heat generated by the LED's can go into the beam shaping element. Because of its relative large surface, a good heat exchange can be realized to the ambient air. The element in front of the light emitting surface does not have to have a beam shaping function per se, but can also be a decorative element with straight walls so that the light is only affected minimally. FIG. 2g schematically depicts a cross-sectional view of the embodiment such as schematically depicted in FIG. 2b (II) and which may comply with above indicated proposal. In this schematically depicted embodiment, the light shaping function is realized by the reflectors 200, here reflector cups, that redirect the light that is generated by the at least ten light sources 10, especially LEDs. The LEDs are placed in an evenly distributed manner on the wall or edge face 120,123, 130 of the cavity which is made by element 161 having an external height Hex and external length Lex. This may be made out of aluminum and can easily be die casted or made in another way. Since the wall of the cavity is created in the same parts as the light shaping element, the thermal conductance is very good and the whole front surface of element may functions as a heat sink. The cavity is closed by a wall 120,122, such as a reflective plate to create a mixing chamber 100 for the light of the light sources 10.

FIG. 3 schematically depicts in top view an embodiment of the lighting unit 1000, with the light sources switched on. In this embodiment, the beam shaping elements 150 are configured in a phyllotaxis pattern. In this embodiment, the external length equals the diameter of the lighting unit.

In further embodiments, the beam shaping elements are made in a separate plate that is mounted in good thermal contact with the back cover. In specific embodiments, to mix the light generated by the LEDs and to create a uniform lit surface, a light guide plate is used instead of an open cavity. In yet further embodiments, the beam shaping elements, such as the reflectors, host a light transmissive solid material.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting unit comprising a light mixing chamber defined by faces and an edge face, wherein a height of the light mixing chamber defined by a distance between the faces is smaller than a first length of the light mixing chamber, wherein the lighting unit comprises a plurality of at least ten light sources configured to provide light source light in the light mixing chamber, wherein at least one of the faces comprises a plurality of chamber openings for escape of at least part of the light source light from the light mixing chamber, wherein the chamber openings have a length equivalent to the thickness of the face comprising said chamber openings, and have a shape and/or diameter that varies with the length, wherein the lighting unit further comprises a plurality of beam shaping elements, with each beam shaping element configured downstream from a corresponding chamber opening, and wherein the beam shaping elements comprise reflectors, wherein the plurality of at least ten light sources are configured in an evenly distributed manner at the edge face and are configured to provide said light source light having an optical axis perpendicular to the height, and wherein the beam shaping elements are configured in a pseudo random pattern.

2. The lighting unit according to claim 1, wherein the reflectors comprise first reflector openings configured aligned with the chamber openings for receipt of light source light escaping from the light mixing chamber and comprising second reflector openings for escape of beam shaped light.

3. The lighting unit according to claim 2, wherein at least part of reflector faces between said first reflector openings and said second reflector openings comprise a metallic mirror material.

4. The lighting unit according to claim 1, wherein the face comprising said plurality of chamber openings and the plurality of beam shaping elements, are comprised by a single unit.

5. The lighting unit according to claim 1, wherein the face comprising said plurality of chamber openings and at least part of the edge face are comprised by a single unit.

6. The lighting unit according to claim 1, wherein the equivalent diameter of the chamber openings increase with increasing distance from the chamber opening in the face.

7. The lighting unit according to claim 1, wherein at least one of the faces comprises elements configured to redirect light source light within the light mixing chamber.

8. The lighting unit according to claim 1, wherein the face comprising the plurality of chamber openings comprises in the range of 0.01-100 chamber openings/cm$^2$, and wherein the lighting unit has a ratio of the first length to the height of $5 \leq L1/H \leq 100$.

9. The lighting unit according to claim 1, wherein the chamber openings have equivalent diameters selected from the range of 0.2-20 mm.

10. The lighting unit according to claim 9, wherein the equivalent diameters of the chamber openings vary as function of the distance from the edge face.

11. The lighting unit according to claim 2, wherein there is a non-zero distance between the chamber openings and first openings of the beam shaping elements.

12. The lighting unit according to claim 1, wherein the beam shaping elements are configured in a phyllotaxis pattern.

13. The lighting unit according to claim 1, wherein the lighting mixing chamber further comprises one or more air openings configured at one or more of the edge face and a face not comprising the plurality of chamber openings.

14. The lighting unit according to claim 1, wherein one or more of the edge face and the face comprising the plurality of chamber openings comprises a thermally conductive material.

* * * * *